Aug. 31, 1937. W. LEATHERS Re. 20,489

VACUUM CLEANER

Original Filed Oct. 15, 1930 2 Sheets-Sheet 1

INVENTOR.

Ward Leathers

Aug. 31, 1937. W. LEATHERS Re. 20,489

VACUUM CLEANER

Original Filed Oct. 15, 1930 2 Sheets-Sheet 2

INVENTOR.
Ward Leathers

Reissued Aug. 31, 1937

Re. 20,489

UNITED STATES PATENT OFFICE 20,489

VACUUM CLEANER

Ward Leathers, Haworth, N. J., assignor, by mesne assignments, to Quadrex Corporation, a corporation of Delaware Original No. 1,937,765, dated December 5, 1933 Serial No. 488,793, October 15, 1930. Application for reissue December 4, 1935, Serial No. 52,880

9 Claims. (Cl. 15—156)

Figure 2:
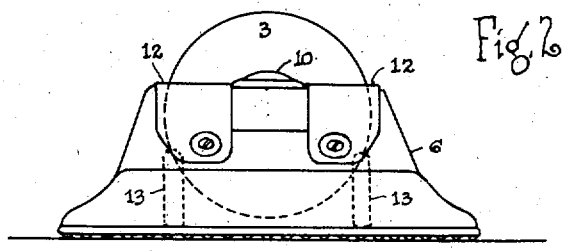
Figure 1:
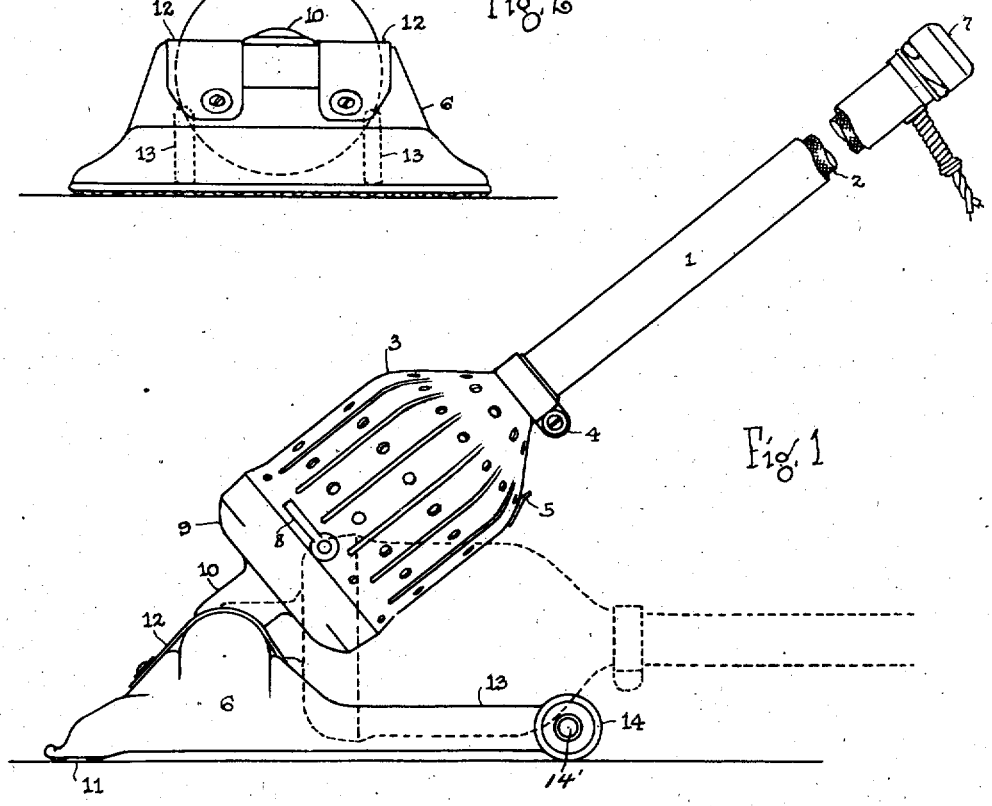
Figure 3:
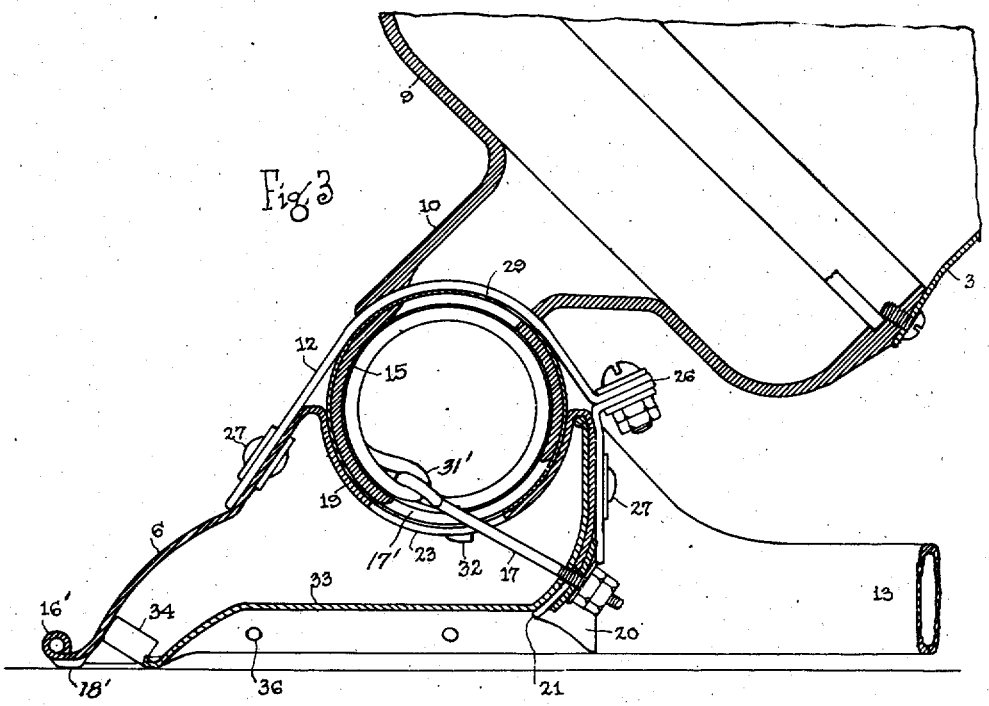
Figure 4:
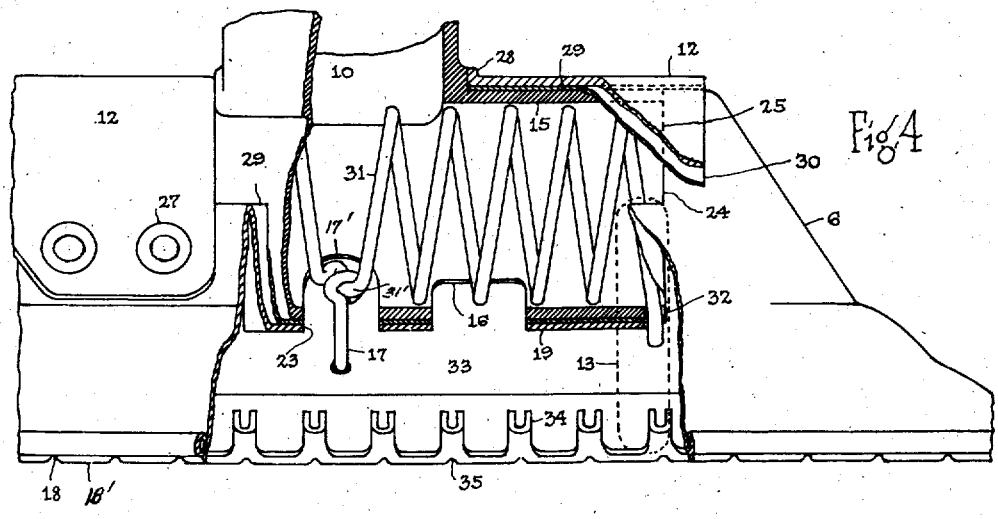

The object of my invention is to produce a vacuum cleaner nozzle which remains parallel with the floor in conjunction with that type of cleaner wherein the motor suction unit is integral with the handle thereof, and hinged to the nozzle.

One of the desirable objects of my invention is to produce a lightweight cleaner of the motor-on-the-handle type which will stand unsupported on the floor, and means whereby the handle will remain at any desirable angle with the floor. A further object of my invention is to produce a device with many or all of the said functions and made in the least expensive manner. To accomplish this purpose, I have devised such hinged nozzle in such form that it may be made essentially of stamped metal.

The vacuum cleaner is of the motor-on-the-handle-type.

In order to set forth my invention so that all familiar with these arts may understand, I have prepared the following specification and appended drawings of which—

Figure I is a side view of a vacuum cleaner within my invention.

Figure II is a front view of same.

Figure III is a partial longitudinal cross-section of the nozzle mechanism.

Figure IV is a transverse cross-section of the same.

In Figure I, 1 is a handle containing a filter element 2. 3 is a perforated filter cover surrounding the motor-housing. The handle 1 is rigidly joined to the cover 3 by suitable means 4. A suitable latch 5 catches the shaft 14′ which joins the rollers 14, latching the under-nozzle-carriage 6 thereto for purposes of convenient storage. Dirt may be blown from the handle of this bagless cleaner by removing the cap 7 and reversing the air current in the filter unit 3 by pressing the thumb-latch 8 as shown in patent application No. 492,424. A blower-housing 9 is provided with an air inlet 10 which inlet is made integral or rigid with a transverse tubular section 15 for purposes of attaching the cleaner mechanism to the nozzle-carriage. It should be noted that with this form of structure the nozzle-suction-handle-unit may be laid flat on the floor while the nozzle at 11 remains parallel with the floor permitting advantageous cleaning under low furniture. The transverse cylindrical portion of 10 is held to the nozzle-carriage by means of suitable straps 12. Two arms 13 projecting backwardly from the nozzle are provided with rollers 14. These rollers may be joined one to the other by a cross-shaft 14′ which, as shown, will not interfere with operating the cleaner flat on the floor as indicated by the dotted lines.

I wish to make it clear that the hinged nozzle-under-carriage 6 may be used with any type of motor blower, filter, or bag construction, as desired. It is applicable, however, primarily to that type of cleaner where the motor-suction-unit is supported on the handle.

Figures III and IV, the fan-housing 9 together with its air inlet 10 and its transverse cylindrical portion 15 are shown as a die-casting, naturally this part may be of other manufacture, such as a sand-casting, or may be built up of stamped parts, or may be stamped and welded to a tube 15. Through the tubular portion 15 there is an opening into 10 and any other suitable ports of inlet, distributed as desired in its lower portion and as shown at 16. A central port or opening 17′, somewhat slot-wise permits of the spring anchorage 17 passing outward therethrough. The openings for air inlet to 15 may be provided practically as desired since it will be noted that both ends of the tube 15 are also open being covered only by the nozzle stamping 6. The nozzle stamping 6 is so formed in the die that it has a front projection 16′ rolled about a wire core to give it rigidity. It also has protuberances 18′ on the bottom between which are notches 18 which permit a slight air inlet. The part 6 has formed in it a semi-cylindrical recessed portion 19 which serves as the cradle and bearing for the tube 15. This part 6 also has two hollow arms 13 extending rearwardly from the nozzle for supporting the shaft 14′ and the rollers 14. Between the arms 13 the part 6 is so formed as to exclude the inlet of air and hold the anchor rod 17. In one of the last stamping operations, the arms 13 may be closed, as shown, on their underside. A slotlike part 23 is provided in the semi-cylindrical portion of 6 which roughly corresponds to the slotlike opening in 15, for the free play of the anchor 17 when the vacuum cleaner is turned on its hinge. Any other ports in 15, as in 16, must also have corresponding ports in the part 6, but, since both ends of the tube 15 are open, these ports 16 may be eliminated entirely if desired. At the line 24 the stamping 6 is sheared a suitable distance at a stamping operation early in its manufacture while part of the stamping is turned upward at 25 on a radius corresponding to and registering flush with the periphery of the tube 15. Suitable straps 12 join the parts 15 and 6 in a hingelike manner. The strap 12 may be made of two pieces (as indicated in Figure III) and clamped together as at 26. The strap 12 may be fastened to the stamping 6 in any suitable manner, such as by rivets shown at 27. The strap 12 overlaps the nozzle 6 at 25 a suitable distance to prevent air leakage and may have a shoulder at 28 to prevent the sideward movement of the parts 9—10—15. The semi-cylindrical part of the stamping 6 as well as the underside of the strap 12 is lined with a suitable, yieldable material 29 such as felt, which may be attached to 6 and 12 by means of cement (such as rubber or cellulose cement). The felt 29 may be cut in one piece provided it covers the semi-cylindrical face of 6 with openings for ports therein and with flaps long enough to extend upwardly around 15 underneath the entire inner surface of 12 and with extensions on the ends as shown at 30 and filling the space between the strap 12 and the stamping 6 so that no leakage may occur on the upper semi-cylindrical juncture of these two parts. A spring 31 may be assembled in the cylinder 15 before 15 is assembled into 6. This spring is turned two ways from the center. A suitable loop 31' at its central portion provides means of attaching the anchor rod 17 after the spring is in the cylinder. Notches 32 on the end of the cylinder 15 provide anchorage for the outward ends of the spring 31. These anchorages are made before the part 9 is set in the part 6. A stamped underpan 33 is provided at its forward edge with turned up channels 34 for supporting the forward edge of the nozzle, and for limiting the size of objects that may enter the cleaner. The notches 35 on the underside serve the same purpose as the notches 18 in the part 6. The underpan 33 may be joined to stamping 6 in any desired manner as by rivets 36. Since the spring 31 is fastened at 32 to the cylinder 15 at both ends and held by the anchor rod 17 in the center, it is possible to set the spring under such tension that it will compensate the weight of the motor unit and vacuum cleaner handle. It is thus possible to make the handle of the vacuum cleaner stand at any angle with the floor desired.

To assemble this nozzle-carriage the straps 12 are riveted to 6 and the wheels 14 applied. The spring 31 is placed in the cylinder 15 with both ends latched in place. The part 9 is set into the part 6 with the felt 29 properly in place. The clamp 26 is closed, and where 26 is eliminated the straps 12 are now riveted or bolted to part 6. The anchorage rod 17 is joined to 31 from the underside of the nozzle. 33 is now joined to 6. The anchorage rod 17 is then given suitable tension by means of nuts.

Having set forth my invention so that all familiar with these arts may understand, I wish it understood that these principles are applicable in many devious ways without departing from the spirit of my invention.

I claim:

1. In a vacuum cleaner, the combination of a base member comprising a suction nozzle, said base having sufficient spread on the floor to support the rest of the cleaner in upright position, a motor-suction-housing; a handle rigid with one end of said housing; a trunnion joint between the other end of the housing and the floor unit comprising a horizontally disposed hollow cylindrical part attached to the housing transversely to the longitudinal axis thereof, said joint also comprising a bearing for the hollow cylindrical part on the base member, there being registering ports through said trunnion parts and suitable connections whereby the suction nozzle is operatively connected through said ported trunnion parts with the interior of the motor-suction-housing; and spring means connected across the trunnion joint arranged to uphold the housing and handle from the floor or base unit.

2. In a vacuum cleaner, the combination of a base member comprising a suction nozzle, said base having sufficient spread on the floor to support the rest of the cleaner in upright position, a motor-suction-housing; a handle rigid with one end of said housing; a trunnion joint between the other end of the housing and the floor unit comprising a horizontally disposed hollow cylindrical part attached to the housing transversely to the longitudinal axis thereof, said joint also comprising a bearing for the hollow cylindrical part on the base member, there being registering ports through said trunnion parts and suitable connections whereby the suction nozzle is operatively connected through said ported trunnion parts with the interior of the motor-suction-housing; and a helical spring within the cylindrical hollow member anchored respectively to said cylindrical member and the bearing-base-member, said spring being adjustable as to tension, to uphold said housing and handle from the floor or base unit.

3. In a vacuum cleaner, the combination of a base member comprising a suction nozzle, said base having sufficient spread on the floor to support the rest of the cleaner in upright position; a motor-suction-housing; a handle rigid with one end of said housing; a trunnion joint between the other end of the housing and the floor unit comprising a horizontally disposed hollow cylindrical part attached to the housing transversely to the longitudinal axis thereof, said joint also comprising a bearing for the hollow cylindrical part on the base member, there being registering ports through said trunnion parts and suitable connections whereby the suction nozzle is operatively connected through said ported trunnion parts with the interior of the motor-suction-housing; and a pair of oppositely wound helical springs disposed end to end within the cylindrical hollow member and said bearing, with their outer ends anchored to said member; and means for tensioning said springs connecting the inner ends of both springs adjustably to the base member, said means extending through the walls of the cylindrical hollow member and its bearings which are slotted for this purpose.

4. In a vacuum cleaner, the combination of a floor member comprising a suction nozzle having a suction nozzle opening, said member having sufficient spread on the floor to support the rest of the cleaner at angles substantially less than a right-angle with the floor, a motor-suction-housing; an operator's handle rigid at one end of said housing; a trunnion joint between the other end of the housing and the floor member comprising horizontal and co-axial cylindrical surfaces disposed parallel to said nozzle opening and having bearing areas for substantially air-tight juncture between them, there being means in said joint whereby the suction nozzle is operatively connected therethrough directly to the interior of the motor-suction-housing.

5. In a vacuum cleaner, the combination of a motor-suction-housing-unit rigidly attached to an operator's handle at one end and having a rigid, hollow, intake extension at the other end, and a floor carriage comprising a suction nozzle at right angles to said handle, said carriage having sufficient spread front to rear on the floor to support the motor-suction-housing-unit free from the floor, and hollow trunnions having bearings joining said extension and said carriage together, there being means in said bearings whereby the suction nozzle is operatively connected through said bearings and said extension directly to the interior of the motor-suction-housing.

6. In a vacuum cleaner, the combination of a motor-suction-housing unit rigidly attached at one end to an operator's handle and having a hollow extension at the other end, and a base member comprising a suction nozzle, said base member having a support sufficiently projecting rearwardly to support the motor-suction-housing-unit and handle in an otherwise unsupported position, and with a floor wheel attached to said support, and a hollow trunnion joint between said motor-suction-housing-unit and said base member there being means in said hollow trunnion joint whereby the suction nozzle is operably connected through said hollow trunnion joint and said extension directly to the interior of the motor-suction-housing.

7. In a vacuum cleaner, the combination of a motor-suction-housing-unit rigidly attached to an operator's handle, and a base member comprising a suction nozzle, said base member having sufficient extension in a rearward direction transverse to the nozzle to support the motor-suction-housing-unit and handle in an otherwise unsupported position, a swivel joint between said housing unit and said floor member disposed transversely to the movement of the cleaner for permitting change in the angular relationship between the cleaner portion and the base member and with the motor-suction-unit air intake immediately adjacent to said swivel joint.

8. In a vacuum cleaner, the combination of a motor-suction-housing unit rigidly attached to an operator's handle, and a base member comprising a suction nozzle, said base member having sufficient extension in a rearward direction transverse to the nozzle to support the motor-suction-housing-unit and handle in an otherwise unsupported position, a swivel joint between said housing unit and said floor member disposed transversely to the movement of the cleaner for permitting change in the angular relationship between the cleaner portion and the base member, said swivelled joint being hollow and providing communication between said nozzle and said suction unit and yieldable but resisting means joined across said joint for holding unaided the motor housing unit at a desired angle with the floor.

9. In a vacuum cleaner, the combination of a motor-suction-housing-unit rigidly attached to an operator's handle, and a base member comprising a suction nozzle, said base member having sufficient extension in a rearward direction transverse to the nozzle to support the motor-suction-housing-unit and handle in an otherwise unsupported position, said base member extension being supported on a wheel, and a hollow trunnion joint bridged by a spring for holding the suction unit in a desired position, one member of said joint being integral with the inlet portion of said suction unit and one with said base member, said hollow trunnion joint members providing communication between said nozzle and said suction unit.

WARD LEATHERS.